S. HYMES.
MEASURING DEVICE.
APPLICATION FILED JAN. 11, 1910.

986,173.

Patented Mar. 7, 1911.

2 SHEETS—SHEET 1.

Witnesses
W. A. Williams.
F. S. Maguire

Inventor
Simon Hymes.
By
Attorney

S. HYMES.
MEASURING DEVICE.
APPLICATION FILED JAN. 11, 1910.
986,173.
Patented Mar. 7, 1911.
2 SHEETS—SHEET 2.
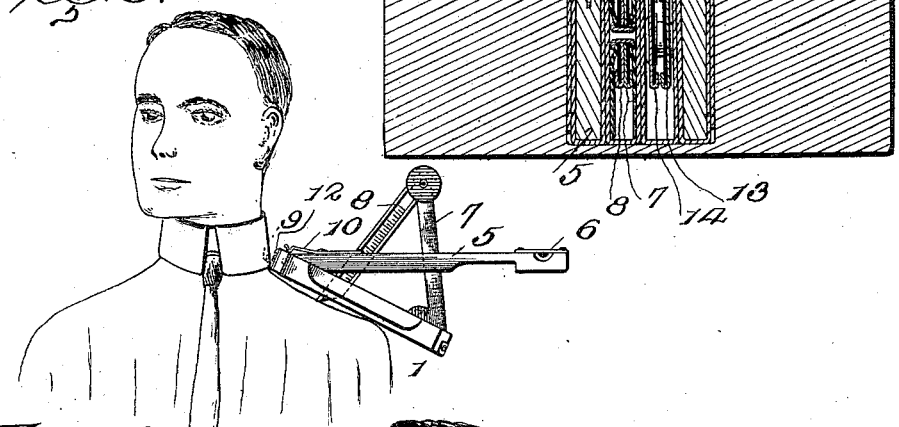
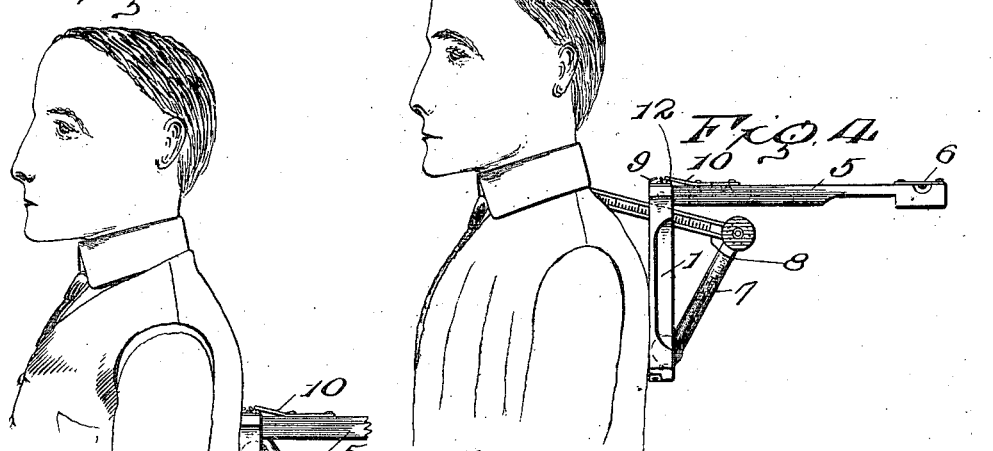
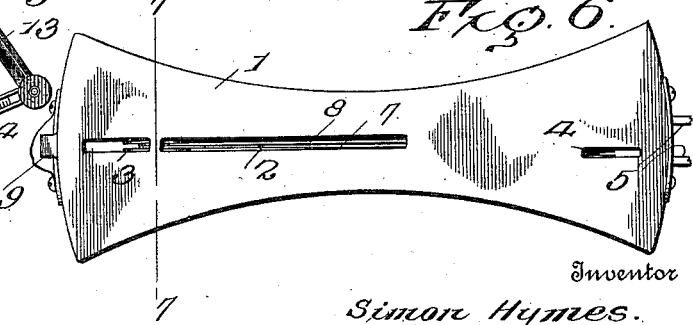
Witnesses
W. A. Williams
F. S. Maguire
Inventor
Simon Hymes.
By
Attorney

UNITED STATES PATENT OFFICE.

SIMON HYMES, OF GLENWOOD SPRINGS, COLORADO.

MEASURING DEVICE.

986,173.      Specification of Letters Patent.      Patented Mar. 7, 1911.

Application filed January 11, 1910. Serial No. 537,503.

*To all whom it may concern:*

Be it known that I, SIMON HYMES, of Glenwood Springs, in the county of Garfield and State of Colorado, have invented certain new and useful Improvements in Measuring Devices; and I do hereby declare the following to be a full, clear, and exact description of the invention, such as will enable others skilled in the art to which it appertains to make and use the same.

The primary object of this invention is to provide an extremely simple and inexpensive device for accurately measuring the slope of a person's shoulders, back, waist, etc., as a guide for tailors in cutting and fitting garments, and which may be used in connection with any system of cutting men's or women's garments.

The human body has three bases from which measurements for cutting garments may be taken; namely, the top of the head, the shoulder, and the foot; but all of these involve more or less sloping, and heretofore it has been the tailor with the most accurate eye in estimating these slopes who produced the best fitting garments. By means of my invention I seek to avoid all danger of uncertainty, and to produce a device by which any person may make perfectly accurate measurements and not be required to depend upon the accuracy of the eye.

The invention will be hereinafter fully set forth and particularly pointed out in the claims.

Figure 1:
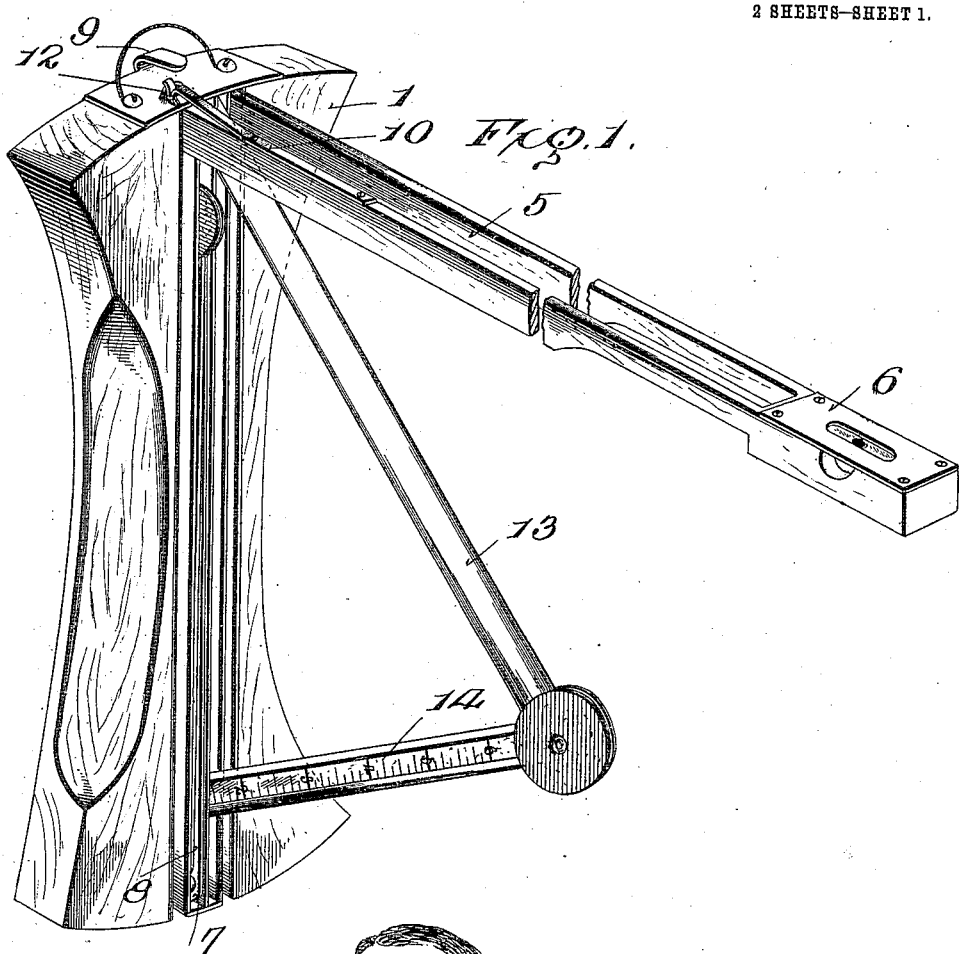
Figure 2:
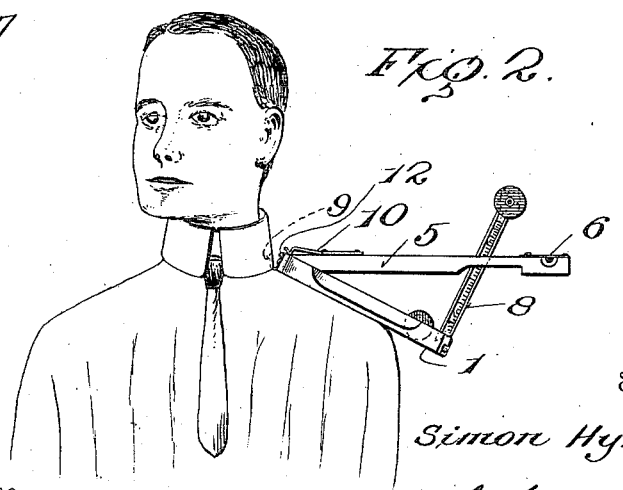

In the accompanying drawings, Figure 1 is a view in perspective of a device embodying my invention, two members of the device being partly raised. Fig. 2 is a side view showing the device as used in measuring the slope of shoulders. Fig. 3 is a similar view showing it as used for indicating the hollowness of the shoulders. Fig. 4 is a side view showing the device used for ascertaining the contour between the shoulders. Fig. 5 is also a side view showing the device as used for ascertaining the hollow of the waist. Fig. 6 is a bottom plan view. Fig. 7 is an enlarged transverse sectional view on lines 7—7, Fig. 6.

Referring to the drawings, 1 designates a base the sides and ends of which are preferably curved. In this base I form a long slot 2 and two short slots 3 and 4 at opposite ends of the base.

5 is an arm which is pivoted at one end to one end of the base, and which carries at its free end the housing 6 of the spirit level, and which when the arm is in its closed position is projected beyond the end of the base. This arm is shown as formed with two corresponding sides between which the spirit level housing is located.

7 is a measuring arm which is pivoted to the base 1 at the end opposite to that to which arm 5 is secured. It is shown as composed of two members, the outer member 8 being capable of being swung at any desired angle relatively to the inner member, and each member carries a scale of graduation. When the device is used for ascertaining shoulder slope the two members are folded together and projected through the space between the sides of the leveling arm 5, the arm 7 being designed to bear against the inner end of housing 6. The base is allowed to rest on the shoulder to be measured, a hook 9 on one end thereof being caused to engage the lower end of the collar of the person being measured. The arm 5 is raised or lowered until the spirit level shows it to be truly horizontal. The figure on the scale directly beneath arm 5 will indicate the slope of the shoulder, as shown in Fig. 2. Should the person being measured have hollow shoulders, it is necessary to ascertain the depth thereof. With the base remaining in the position stated, and shown in Fig. 2, the measuring arm 7 is opened by moving outwardly the free end of member 8 and projecting such end through slot 2 of the base. By pressing this end into the deepest part of the hollow, the depth of the latter will be indicated by the scale on member 8 at the point where it passes through the base.

To learn the stoop between the shoulders the leveling arm 5 is raised until it is at right angles to the base, and it is preferably held in such position by a spring-arm 10 carried thereby engaging a shoulder 12 on the end of the base. The latter is then held vertically with its lower end resting against the back of the customer, and the free end of member 8 is projected through slot 3 to engage the collar button or neck-band, as shown in Fig. 4. The device with the parts arranged as just described, and as shown in Fig. 4, may be employed for ascertaining the curvature of the seat, the hips and the abdomen.

For ascertaining the depth or hollow of the waist it is necessary that the upper end of the base bear against the back at a point above the hollow, and hence a second measuring arm 13 is employed. This arm is a duplicate of the arm 7, but is pivoted to the base at the same end that the leveling arm is pivoted thereto. The free end of the outer member 14 of this second measuring arm is projected through the lower slot 4 until it bears against the waist. With the leveling arm truly horizontal, the measurement is indicated by the scale on the outer member 14.

Although the two measuring arms 7 and 13 may be mounted in any suitable manner, yet I preferably provide the base with a longitudinally extended compartment for such arms, and also for the leveling arm 5. This compartment is preferably provided with spaced-apart walls by which it is divided into sections for the several arms.

The advantages of my invention will be at once apparent to those skilled in the art. The device may be used in connection with any system adapted for cutting garments for men or women. It does away with all guesswork in shaping garments, and enables the tailor to accurately measure the slope and curvature of his customer's shoulders, back, waist, hips, etc. The device is exceedingly simple and inexpensive and being composed of but few parts is not liable to readily get out of order.

I claim as my invention:—

1. A tailor's measuring device comprising a base having a compartment extending longitudinally thereof, a movable arm projecting from the base and carrying a spirit level, said arm being designed, when not in use, to fit within said compartment of the base, and a measuring member extending from said base and intersecting the plane of said arm when the latter is extended, said base being designed to rest upon the shoulder of a person being measured.

2. A tailor's measuring device comprising a base having a compartment extending longitudinally thereof, a movable arm projecting from said base at one end thereof and carrying a spirit level, and a second arm pivoted to said base at the other end thereof and intersecting the plane of the first mentioned arm, both of said arms being designed, when not in use, to fit within said compartment.

3. A tailor's measuring device comprising a base having a longitudinally extended slot, an arm pivotally secured to the base at one end thereof, a spirit level carried by said arm, a measuring arm pivoted to said base at the end thereof opposite to the first mentioned arm, said measuring arm being designed to intersect the plane of said first mentioned arm and having a pivoted member which is designed to project through said slot.

4. A tailor's measuring device comprising a base having a slot formed therein, an arm pivoted to one end of said base, a spirit level carried by said arm, said arm having spaced-apart sides, a measuring arm pivoted to said base at the other end thereof and designed to project between the sides of the first mentioned arm, said measuring arm having a pivoted member which is designed to project through the slot in the base.

5. A tailor's measuring device comprising a base having a slot therein, an arm pivoted to said base at one end thereof and carrying a spirit level, means for holding said arm at right angles to said base and a measuring arm pivoted to the base at one end thereof and having a pivoted member which is designed to project through said slot.

6. A tailor's measuring device comprising a base, an arm pivoted to the upper end of the base and having a spirit level, a measuring arm also pivoted to the upper end of the base and having a member pivoted to its outer end and designed to project through the plane of said base.

7. A tailor's measuring device comprising a base having slots in its opposite ends, an arm pivoted to said base at one end thereof and carrying a spirit level, and two measuring arms pivoted to opposite ends of the base, each measuring arm having a pivoted member the free end of which is designed to be projected through one of the slots in the base.

8. A tailor's measuring device comprising a base having a compartment extending longitudinally thereof and also having slots in its opposite ends, an arm pivoted to said base at one end thereof and carrying a spirit level, and two measuring arms pivoted to opposite ends of the base, each measuring arm having a pivoted member, the free end of which is designed to be projected through one of the slots in the base, each of said arms being designed, when not in use, to fit within said compartment.

In testimony whereof, I have signed this specification in the presence of two subscribing witnesses.

SIMON HYMES.

Witnesses:
THEODORE ROSENBERG,
KARL D. ROSENBERG.

Copies of this patent may be obtained for five cents each, by addressing the "Commissioner of Patents, Washington, D. C."